United States Patent [19]
Kakuse et al.

[11] Patent Number: 5,163,134
[45] Date of Patent: Nov. 10, 1992

[54] METHOD AND APPARATUS FOR CONTROLLING DATA WRITING IN MAGNETIC RECORDING SUBSYSTEM

[75] Inventors: Katsuharu Kakuse, Hadano; Kenichi Kageura, Fujisawa; Takashi Doi, Hadano, all of Japan

[73] Assignee: Hitachi, Ltd., Tokyo, Japan

[21] Appl. No.: 304,519

[22] Filed: Jan. 31, 1989

[30] Foreign Application Priority Data

Feb. 19, 1988 [JP] Japan .................... 63-35090

[51] Int. Cl.⁵ .................... G11C 7/00; G11C 8/00; G06F 12/00; G06F 13/00
[52] U.S. Cl. .................... 395/275; 395/425; 395/400; 365/230.08
[58] Field of Search .................... 365/230.03, 230.08; 395/425, 375, 250, 275

[56] References Cited

U.S. PATENT DOCUMENTS

| | | | |
|---|---|---|---|
| 4,258,418 | 3/1981 | Heath | 364/200 |
| 4,393,445 | 7/1983 | Milligan et al. | 364/200 |
| 4,420,807 | 12/1983 | Nolta et al. | 364/200 |
| 4,430,699 | 2/1984 | Segarra et al. | 364/200 |
| 4,456,933 | 6/1984 | Schneider et al. | 360/49 |

*Primary Examiner*—Alyssa H. Bowler
*Attorney, Agent, or Firm*—Fay, Sharpe, Beall, Fagan, Minnich & McKee

[57] ABSTRACT

A magnetic recording subsystem comprises a channel unit, a magnetic recording control unit having a data buffer for temporarily storing data blocks of data transferred from the channel unit and a plurality of magnetic recording units connected to the magnetic recording control unit. When the data is stored into the data buffer, a block number is assigned to each data block. When the data is read from the data buffer and to be stored into a designated magnetic recording unit, the block number supplied from the data buffer and the block number assigned when the data was stored into the data buffer are compared, and then the data is stored into the magnetic recording unit.

9 Claims, 5 Drawing Sheets

METHOD AND APPARATUS FOR CONTROLLING DATA WRITING IN MAGNETIC RECORDING SUBSYSTEM

BACKGROUND OF THE INVENTION

The present invention relates to a method for controlling data writing in a magnetic recording subsystem which uses a data buffer unit, and more particularly to method and apparatus for controlling data writing suitable for preventing an error in writing data into a magnetic recording media in a magnetic recording apparatus.

A magnetic tape and a magnetic disk have been known as magnetic recording media. The magnetic tape is referred to in the present invention.

FIGS. 3A and 3B show examples of prior art cartridge type magnetic tape subsystems. In the cartridge type magnetic tape subsystem of FIG. 3A, data transfer between a channel unit 2 and a channel interface control 3, and write/read operations between a write circuit 5 and a read circuit 6, and a magnetic tape unit 11 are effected time-serially. A long start/stop time for the magnetic tape is required in the write/read operations. The write/read operations require a longer time than the data transfer, and a data processing speed of the magnetic tape subsystem is limited by the write/read speed. In the cartridge type magnetic tape subsystem of FIG. 3B, a data buffer 4 is provided between the channel interface control 3, and the write circuit 5 and the read circuit 6. In the subsystem of FIG. 3B, when transferred data is to be written, a plurality of blocks are stored in the data buffer in the magnetic tape control unit and those blocks are collectively written into the cartridge type magnetic tape unit.

In the cartridge type magnetic tape subsystem of FIG. 3B, the number of times of start/stop operations of the magnetic tape unit is reduced to avoid reduction of operation efficiency of the system due to frequent repetition of the start/stop operations in order to efficiently operate the system.

JP-A-57-161956 discloses an invention which relates to the above prior art.

In the prior art, no attention has been paid to check whether the plurality of write data blocks temporarily stored in the data buffer in the magnetic tape control unit have been surely written into a designated one of a plurality of magnetic tape units. As a result, there may be an error in which the data are written into a different magnetic tape unit than the designated one or data at a wrong location on the data buffer are written. In the magnetic tape subsystem of FIG. 3B, the data buffer is provided in order to improve the data processing speed of the overall magnetic recording subsystem. As a result, the necessity to check the error in writing data has increased.

As the computers have been commonly used, the magnetic recording subsystems are used in bank transaction computation, payroll computation and parts ordering in a manufacturing process. In those areas, a severe reliability is required to the magnetic recording subsystems.

The present invention intends to resolve the problems encountered in the prior art and it provides method and apparatus for controlling data writing in a magnetic recording subsystem which assure exact writing of data blocks stored in a data buffer of a magnetic recording unit into a designated magnetic recording unit (for example, magnetic tape unit, or magnetic disk unit).

SUMMARY OF THE INVENTION

The present invention is applicable to a magnetic tape subsystem comprising a channel unit, a magnetic tape control unit having a data buffer for temporarily storing blocks of data transferred from the channel unit, and a plurality of magnetic tape units connected to the magnetic tape control unit. When the data are stored into the data buffer block numbers are assigned to the respective blocks, and when they are read from the data buffer and written into a designated magnetic tape unit, the block numbers are checked before the data blocks are written into the magnetic tape unit.

In accordance with the present invention, the data transferred from the channel unit for writing into the designated magnetic tape unit is assigned with block numbers for the respective data blocks, and then they are stored in the data buffer. When the data is to be written into the magnetic tape unit, the block number of the data block to be written and the data block number read from the buffer are compared in order to assure exact writing of the data into the designated magnetic tape unit.

DESCRIPTION OF THE PREFERRED EMBODIMENTS

An embodiment of the present invention is now explained with reference to the accompanying drawings.

Figure 1A:
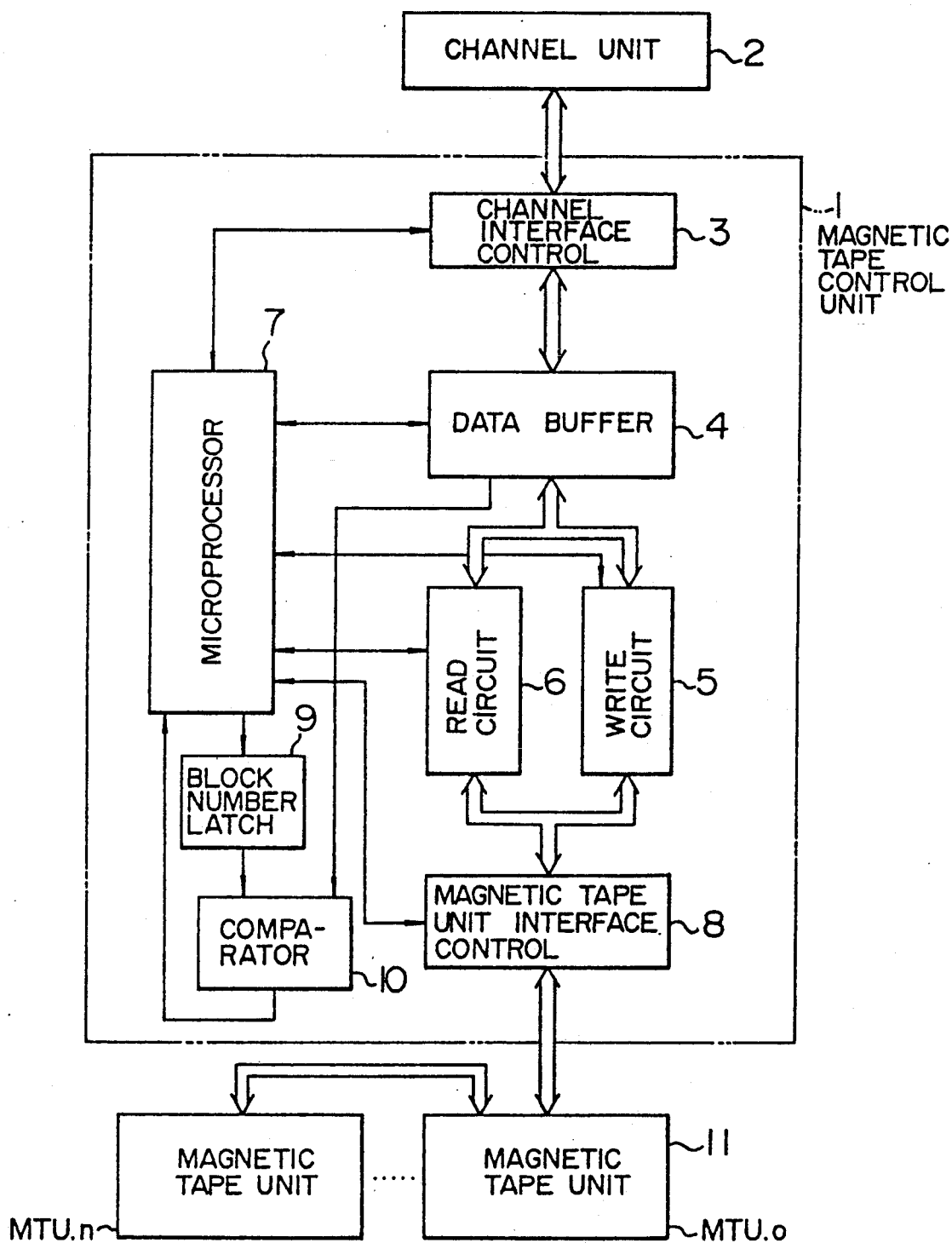
FIG. 1A shows a block diagram of one embodiment of a method for controlling data writing in a magnetic recording subsystem of the present invention where a magnetic tape is used.

FIG. 1 shows a block diagram of a first embodiment of the present invention where a magnetic tape is used. In a write operation, data is transferred from a channel unit 2 to a channel interface unit 3 in a magnetic tape control unit 1. A data buffer 4 temporarily stores the transferred data. A microprocessor 7 assigns block numbers to the respective data blocks of the data and stores the data blocks into the data buffer 4.

When an area in the data buffer 4 allocated to a specific magnetic tape unit ($MTU_0, \ldots MTU_n$) becomes full, a write circuit 5 writes the data blocks, with write modulation, into the designated magnetic tape unit ($MTU_0, \ldots MTU_n$) through a magnetic tape unit interface control 8. The microprocessor 7 supplies the expected block number of the data block to a block number latch 9, which in turn supplies it to a comparator 10. On the other hand, the block number of the data block supplied to the write circuit 5 is supplied to the comparator 10 through the data buffer 4. The comparator 10 compares the block number supplied from the microprocessor 7 with the block number supplied from the data buffer 4, and when they are not equal, it reports the error to the microprocessor 7.

Figure 2:
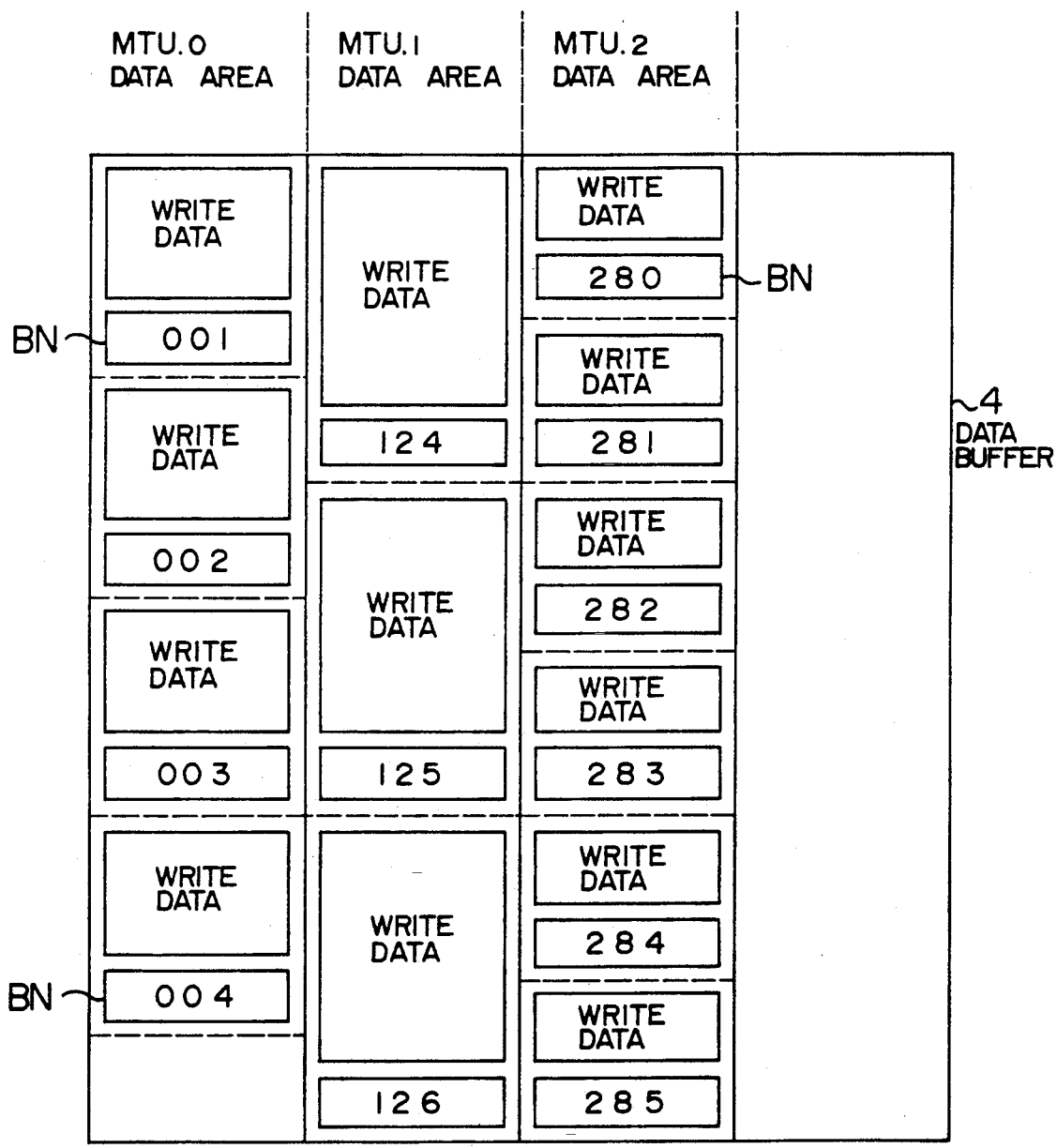
FIG. 2 shows an example of data blocks stored in a data buffer shown in FIG. 1.
Figure 3A:
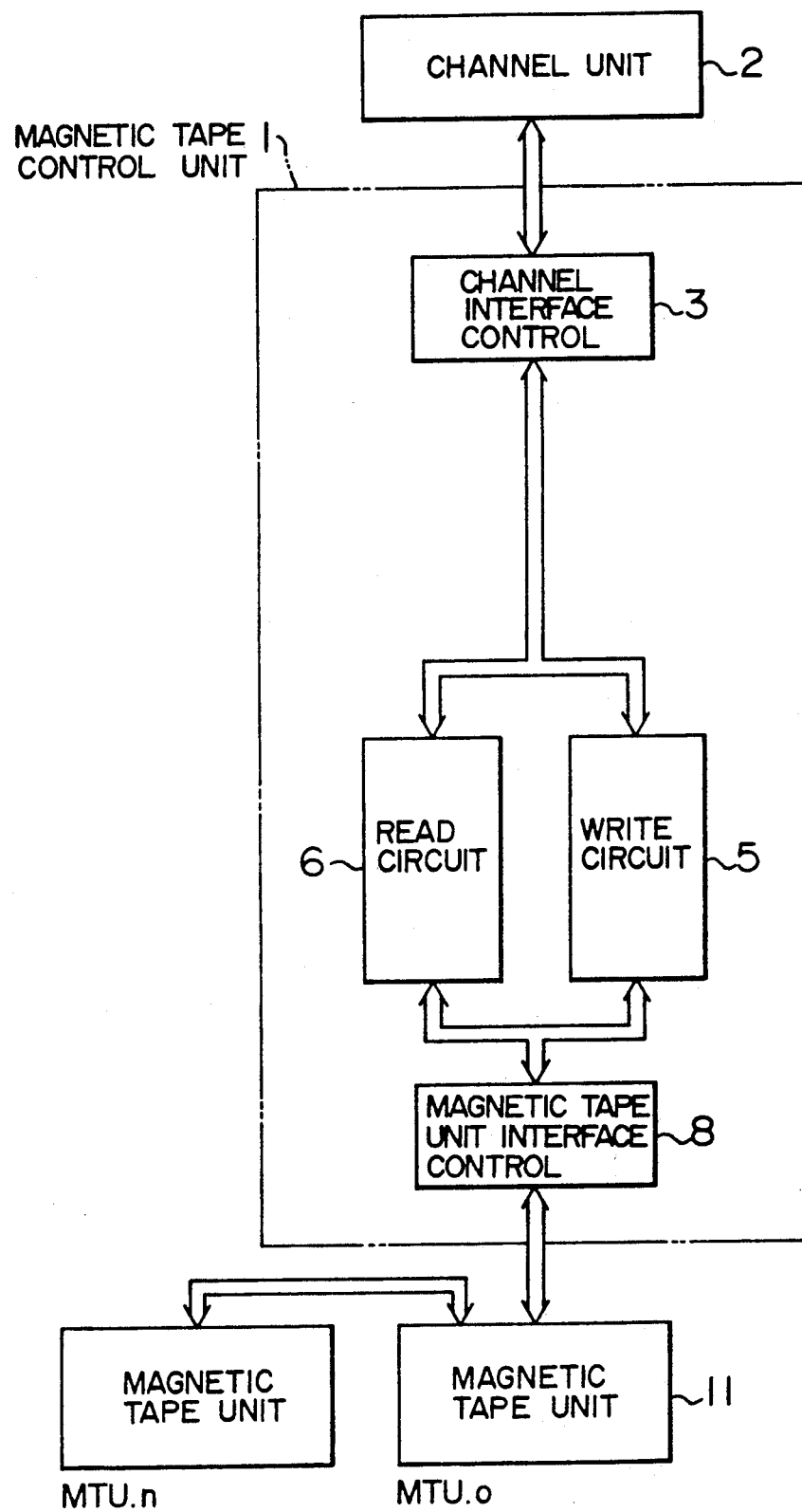
FIG. 3A shows a block diagram of a prior art magnetic recording subsystem.
Figure 3B:
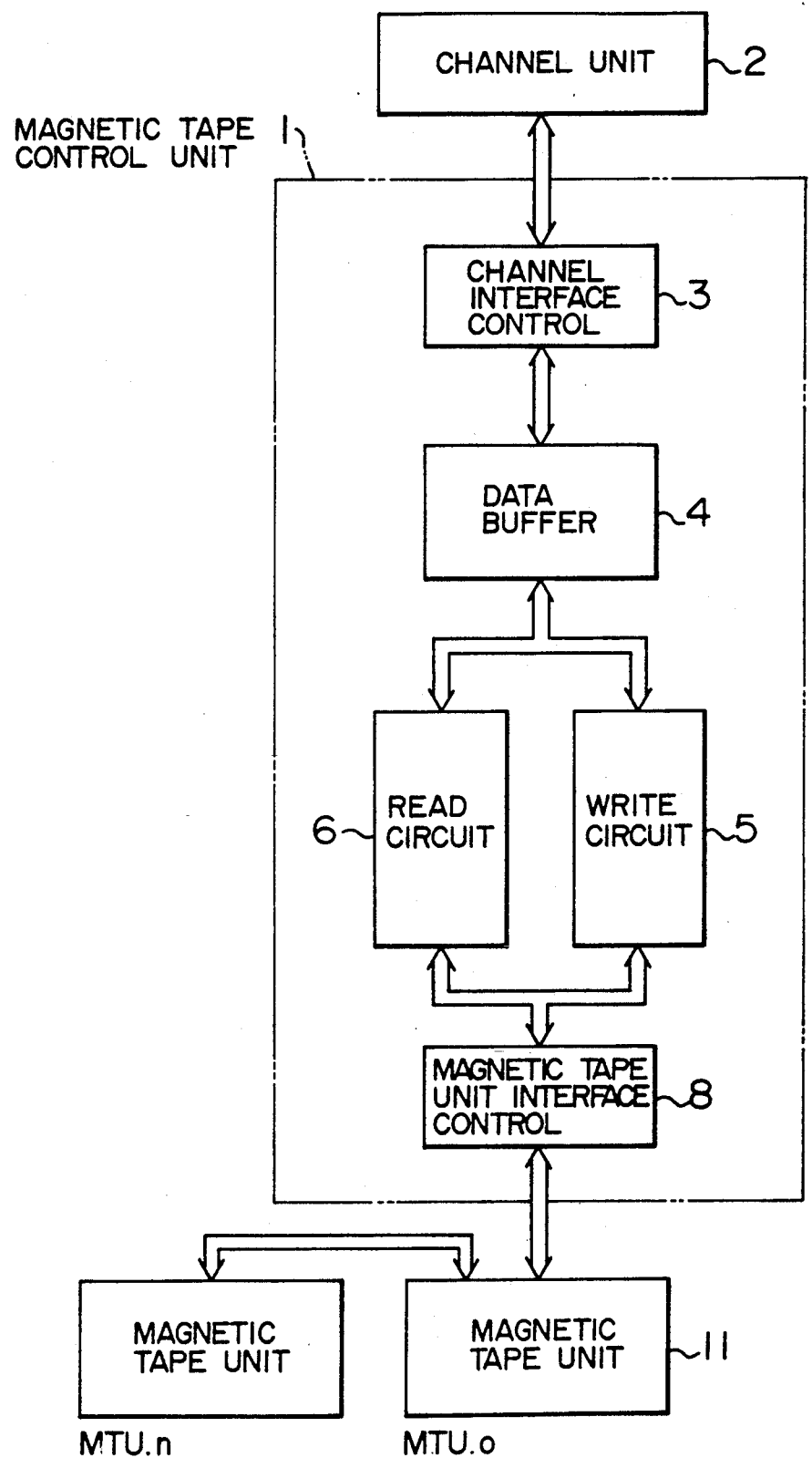
FIG. 3B shows a block diagram of another prior art magnetic recording subsystem.

FIG. 2 shows an example of data blocks stored in the data buffer 4. As shown, the data buffer 4 is divided into storage areas for the respective magnetic tape units $MTU_O$ - $MTU_n$. For example, the data stored in the magnetic tape unit $MTU_O$ is stored into the data area for the $MTU_O$, one block at a time. The data of each data block is assigned with a block number BN. In the present embodiment, the block number BN consists of three digits. The third digit indicates a unit number of the magnetic tape unit (for example, i of $MTU_i$), and the two low order digits indicate the number of data blocks. In the present embodiment, when the storage area for the magnetic tape unit $MTU_O$ is full, the microprocessor 7 writes the data blocks stored in the storage area for the magnetic tape unit $MTU_O$ into the magnetic tape unit $MTU_O$. At this time, the block numbers BN are compared by the comparator 10.

In FIG. 2, the block number BN consists of the magnetic tape unit number and two digits representing the number of data blocks, although the present invention is not limited to the above, and any number of digits may be used or a unit address of the magnetic tape unit may be used.

In accordance with the present invention, the writing of the data blocks stored in the data buffer in the magnetic tape control unit into a wrong magnetic tape unit other than the designated magnetic tape unit is prevented. When the data block is read from a wrong address area of the data buffer or the data block of the data buffer is incorrectly extracted, the error is reported to the microprocessor to prevent error in recording.

Figure 1B:
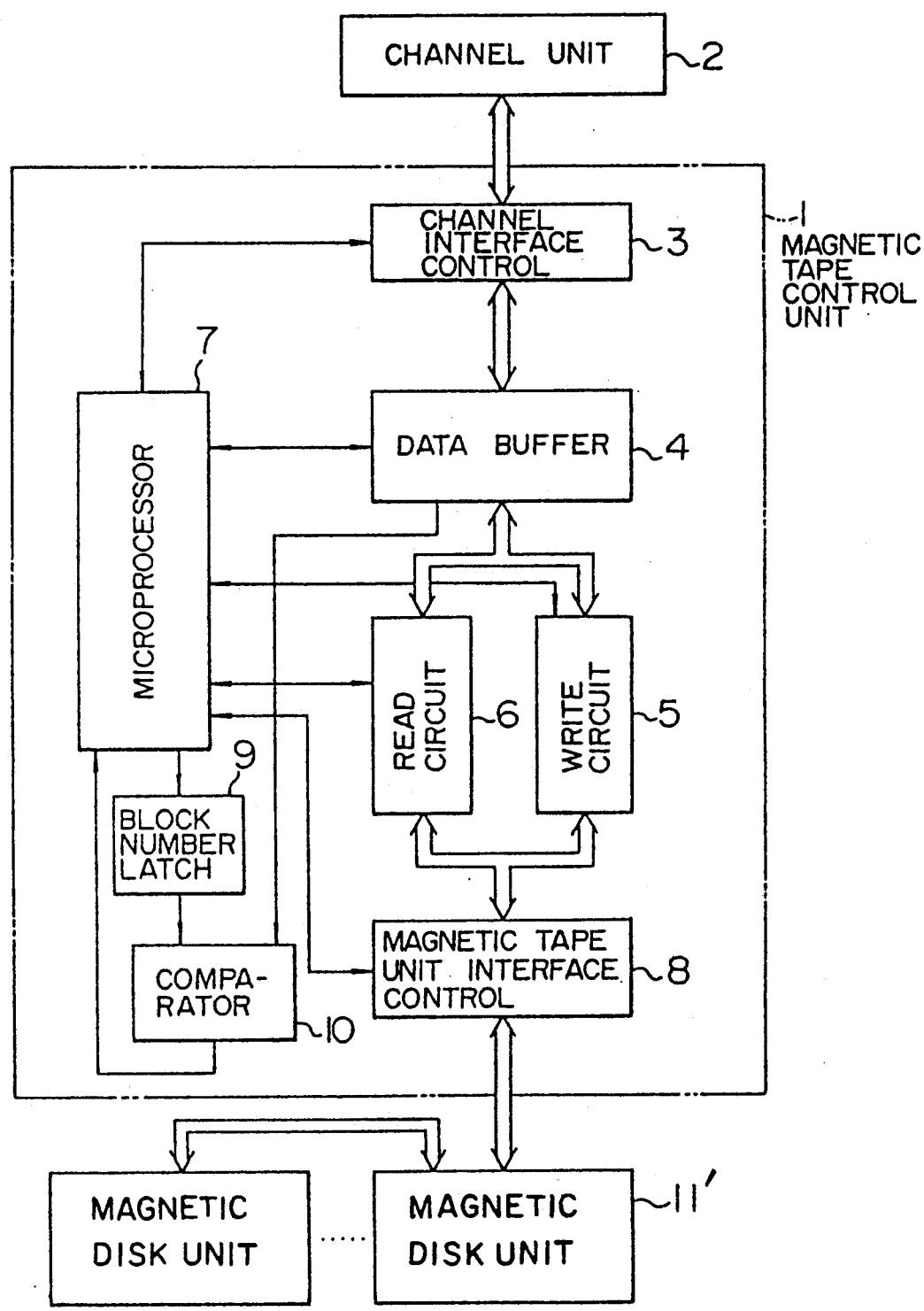
FIG. 1B shows a block diagram of another embodiment of a method for controlling data writing in a magnetic recording subsystem of the present invention where a magnetic disk unit is used.

While the magnetic tape recording unit has been explained, the present invention is applicable to any magnetic recording apparatus such as a magnetic disk recording unit as shown in connection with FIG. 1B. The elements of FIG. 1B being the same as that of FIG. 1A except for magnetic disk units 11' being implemented in place of magnetic tape units 11.

In accordance with the present invention, whether the data has been correctly read from the data buffer or not is checked so that the reliability in writing the data into the magnetic recording unit is significantly improved.

We claim:

1. In a magnetic recording subsystem comprising a channel unit, a magnetic recording control unit having a data buffer for storing data blocks of data transferred from said channel unit, and a plurality of magnetic recording units connected to said magnetic recording control unit, a method for controlling data writing in the magnetic recording subsystem comprising the steps of:

storing in the data buffer data blocks of data transferred from the control unit;
   assigning a block number to each data block of the data stored in said data buffer, to designate a magnetic recording unit of the magnetic recording units;
   reading data of a data block of the data blocks stored in the data buffer;
   comparing the block number of the data read from said data buffer with the block number assigned to the data in the assigning step; and
   storing the data corresponding to the block numbers into the designated magnetic recording unit when the block numbers are equal.

2. A method for controlling data writing in a magnetic recording subsystem according to claim 1 wherein said magnetic recording control unit includes a microprocessor and a comparator, said microprocessor assigns a block number to each data block when the data is stored into said data buffer, and when the data is read from said data buffer and to be stored into the designated magnetic recording unit, said microprocessor supplies the assigned block number to said comparator while said data buffer supplies the block number read from said data buffer to said comparator, said comparator compares the block number supplied from said microprocessor with the block number supplied from said data buffer, and then the data is stored into said magnetic recording unit.

3. A method for controlling data writing in a magnetic recording subsystem according to claim 1 wherein a magnetic recording medium of said magnetic recording unit is a magnetic tape.

4. A method for controlling data writing in a magnetic recording subsystem according to claim 1 wherein a magnetic recording medium of said magnetic recording unit is a magnetic disk.

5. A method for controlling data writing in a magnetic recording subsystem according to claim 1 wherein said block number includes a unit number of said magnetic recording unit.

6. A method for controlling data writing in a magnetic recording subsystem according to claim 1 wherein said block number consists of a unit number of said magnetic recording unit and a data block assigned to each magnetic recording unit.

7. A data writing control apparatus for a magnetic recording subsystem comprising:

a channel unit;
   a magnetic recording control unit connected to said channel unit and including a data buffer including a plurality of data areas for temporarily storing data transferred from said channel unit, a microprocessor for assigning a block number to each data block of the data stored in said data buffer, and a comparator for comparing the block number of data read from said data buffer with the block number assigned to the data; and
   a plurality of magnetic recording units connected to said magnetic recording control unit, for storing the data transferred from each of said data areas of said data buffer, when the block numbers are equal.

8. A data writing control apparatus for a magnetic recording control subsystem according to claim 7 wherein a magnetic recording medium of said magnetic recording unit is a magnetic tape.

9. A data writing control apparatus for a magnetic recording subsystem according to claim 7 wherein a magnetic recording medium of said magnetic recording unit is a magnetic disk.

* * * * *